United States Patent
Stagliano, Jr. et al.

(10) Patent No.: US 7,439,899 B2
(45) Date of Patent: Oct. 21, 2008

(54) ENCODED TRANSMITTED SIGNALS IN A SIMULTANEOUS DUAL POLARIZATION WEATHER SYSTEM

(75) Inventors: James J. Stagliano, Jr., Daleville, AL (US); James Larry Alford, Enterprise, AL (US); James Rogers Helvin, Enterprise, AL (US); Dean A. Nelson, Enterprise, AL (US)

(73) Assignee: Enterprise Electronics Corporation, Enterprise, AL (US)

( * ) Notice: Subject to any disclaimer, the term of this patent is extended or adjusted under 35 U.S.C. 154(b) by 248 days.

(21) Appl. No.: 11/386,312

(22) Filed: Mar. 22, 2006

(65) Prior Publication Data
US 2007/0222660 A1 Sep. 27, 2007

(51) Int. Cl.
*G01S 13/95* (2006.01)

(52) U.S. Cl. ............ 342/26 R; 342/194; 342/188; 342/21

(58) Field of Classification Search ............ 342/21, 342/26 R, 26 A, 26 B, 26 C, 26 D, 188, 194
See application file for complete search history.

(56) References Cited

U.S. PATENT DOCUMENTS

| | | | | |
|---|---|---|---|---|
| 3,918,055 | A * | 11/1975 | Shimizu et al. | 342/159 |
| 4,649,388 | A * | 3/1987 | Atlas | 342/26 D |
| 4,684,951 | A | 8/1987 | Baumer | 342/362 |
| 4,849,762 | A * | 7/1989 | Barnes | 342/188 |
| 4,868,917 | A | 9/1989 | Woolcock | 342/26 |
| RE33,152 | E * | 1/1990 | Atlas | 342/26 R |
| 5,500,646 | A | 3/1996 | Zrnic | 342/188 |
| 5,621,410 | A | 4/1997 | Gray et al. | 342/26 |
| 5,726,657 | A | 3/1998 | Pergande et al. | 342/202 |
| 5,793,334 | A | 8/1998 | Anderson et al. | 343/786 |
| 5,940,776 | A | 8/1999 | Baron et al. | 702/4 |
| 6,061,013 | A | 5/2000 | Sauvageot et al. | 342/26 |
| 6,473,026 | B1 | 10/2002 | Ali-Mehenni et al. | 342/26 |
| 6,781,540 | B1 * | 8/2004 | MacKey et al. | 342/25 F |
| 6,803,875 | B1 * | 10/2004 | Alford et al. | 342/26 R |
| 6,859,163 | B2 * | 2/2005 | Alford et al. | 342/26 D |
| 7,049,997 | B2 | 5/2006 | Alford et al. | 342/26 |
| 2005/0093734 | A1 * | 5/2005 | Alford et al. | 342/26 R |
| 2005/0270231 | A1 * | 12/2005 | Small | 342/194 |
| 2007/0152867 | A1 * | 7/2007 | Randall | 342/26 R |

(Continued)

OTHER PUBLICATIONS

Doviak, R.J., Bringi, A. Ryzhkov, A. Zahrai, D.S. Zrnic. "Considerations for Polarimetric Upgrades to Operational WSR-88D Radars." Journal of Atmospheric and Oceanic Technology, Mar. 2000, vol. 17, pp. 257-278.

(Continued)

*Primary Examiner*—John B Sotomayor
(74) *Attorney, Agent, or Firm*—Russell Carter Gache; Maynard Cooper & Gale, PC

(57) ABSTRACT

A system for simultaneously propagating dual polarized signals in a polarimetric radar system includes a system for coding at least one of the two signals. The simultaneous dual polarization weather radar transmits signals in both the horizontal and vertical orientations at the same time. Upon reception, the signals in each channel are decoded and a number of standard and polarimetric parameters characterizing atmospheric conditions are determined. The accuracy upon which these parameters can be determined depends partially upon the interference between these two channels. The system and method isolates the vertical and horizontal channels to minimize the interference.

18 Claims, 4 Drawing Sheets

U.S. PATENT DOCUMENTS

2007/0222661 A1* 9/2007 Stagliano et al. .......... 342/26 R

OTHER PUBLICATIONS

Liu, Y., J.W. Conway, E.A. Brandes, A.V. Rzyhkov, J. Vivekanandan, D.S. Zrnic, and R. Oye. "The Use of Polarization Data in the Operational Identification of Hydromeoter and Non-hydrometeor Targets." Preprints, 29th Conf. Radar Meteor. Montreal, Canada: American Meteorological Society 1999: pp. 178-179.

Ryzhkov A., R. Lopez, R. Fulton, D. Zrnic, T. Schuur and Y. Liu. "Hydrometeor Classification with a Polarimetric Radar for Improved Rainfall Measurements and Detection of Hail and Electrically Charged Regions." Preprints, 29th Conference on Radar Meteorology. Montreal, Canada: American Meteorological Society, 1999: pp. 289-292.

Next Generation Weather Radar Program Operational Support Facility.

Skolnik, Merrill I. "Introduction to Radar Systems." New York: 3rd ed 2001.

Vivekanandan, J., D.S. Zrnic, S.M. Ellis, R. Oye, A.V. Ryzhkov, and J. Straka "Cloud Microphysics Retrieval Using S-band Dual-polarization Radar Measurements." Bulletin of the American Meteorological Society 1999: pp. 381-388.

Zahrai Allen and Dr. Dusan Zrnic. "Implementation of Polarimetric Capability for the WSR-88D (NEXRAD) Radar." Long Beach, CA. American Meteorological Society 1997.

Zrnic, D.S., and A.V. Ryzhkov. "Polarimetry for Weather Surveillance Radars." Bulletin of the American Meteorological Society 1999: pp. 389-406.

Zrnic, D.S. Zahrai, A., Doviak, R.J., Carter, J., and Torres, S. "Polarimetric Upgrades of the NOAA's WSR-88D Research and Development Radar." 7.14.

* cited by examiner

ENCODED TRANSMITTED SIGNALS IN A SIMULTANEOUS DUAL POLARIZATION WEATHER SYSTEM

TECHNICAL FIELD

The present invention relates generally to weather radar systems. Particularly, the present invention relates to Doppler weather radar systems utilizing dual polarization to enhance reflectivity resolutions of liquid hydrometeors.

BACKGROUND OF THE INVENTION

The majority of weather radar systems in operation today utilize a single polarization strategy to enhance precipitation reflectivity. Liquid hydrometeors (e.g. raindrops) deviate from a sphere when their radius is greater than about 1 mm and have a shape more like that of an oblate spheroid with a flattened base (similar to a hamburger bun) that gives a slightly stronger horizontal return. Hence, current radar systems are typically horizontally polarized to enhance precipitation returns.

However, singly polarized radar systems have severe limitations in regions with partial beam blockage and such systems do not facilitate hydrometeor classification. To overcome these shortcomings of singly polarized weather radar systems, systems with alternating pulses of horizontally and vertically polarized signals have been developed. These dual polarized radar system, sometimes referred to as "polarimetric weather radars," offer several advantages over conventional radars in estimating precipitation types and amounts. Foremost among these advantages are the capability to discriminate between hail and rain, detect mixed phase precipitation, and estimate rainfall volume.

Current dual polarized radar systems utilize polarization that is altered sequentially between linear vertical and linear horizontal to capture data enhancing values, such as, for example: (1) reflectivity factors at both horizontal and vertical polarization; (2) differential reflectivity for two reflectivity factors; (3) cumulative differential phasing between the horizontally and vertically polarized echoes; (4) correlation coefficients between vertically and horizontally polarized echoes; and (5) linear depolarization ratios. In addition, Doppler velocity and spectrum width can be obtained by suitably processing the horizontally and vertically polarized return signals.

Dual polarized radar systems also allow for the implementation of precipitation classification schemes from inference radar processing of hydrometeor shapes as discussed in various papers authored by practitioners who work in these areas, such as, Ryzhkov, Liu, Vivekanandan, and Zrnic. In addition, by looking at phase differences between the horizontal and vertical components, the effects of partial beam blockage can be mitigated and greater clutter rejection can be obtained. However, the underlying assumption is that subsequent pulses (those of each polarization) are highly correlated and provide an effective velocity range reduced by a factor of two.

Another limitation of current alternating dual polarization radar systems is long dwell times and velocity range reductions. Any received reflection signal resulting from either polarization modes is assumed to come from the same scatterers (e.g. hydrometeors). In order to correlate the data from both the horizontally polarized and vertically polarized channels in current systems utilizing a waveguide switch, a single polarization pulse is transmitted followed by a period of delay (the dwell time) while reflections signals are being received. The opposing polarity pulse is subsequently sent and additional data is received by the same (single) receiver chain during a second dwell time. Reception of reflection signals, therefore, occurs during these two dwell periods during antenna rotation within a single beamwidth, resulting in a longer total dwell time for each beamwidth interrogation. Similarly, since the dwell time for each beamwidth interrogation (vertical+horizontal) is doubled, computational velocity perception is halved, thereby limiting the ability of current systems to resolve relatively high wind velocities in radar returns.

Improved dual polarization weather radar systems use simultaneous dual polarization modes to solve issues such as long dwell times and velocity range reductions instead of alternating polarization modes. Dual polarized systems, which propagate both a horizontal and a perpendicularly vertical wave simultaneously, have additional problems relating to the interference between the horizontal and vertical component. As shown in FIG. 1A, a dual polarized simultaneous wave 10 has a horizontal component 12 and a vertical component 14. The two components are characterized by their amplitudes and the relative phase between them. When viewed along the direction of propagation, the tip of propagated wave vector of a fully polarized wave traces out a regular pattern of an ellipse. The shape of the ellipse is governed by the magnitudes and relative phase between the horizontal 12 and vertical components 14 of the wave. As the dual polarized elliptical wave 10 hits a reflective surface, the reflective surface can change the polarization of the wave 10 as it is reflected to be different from the polarization of the wave as it propagates. The radar antenna may be designed to receive the different polarization components of the wave 10 simultaneously. For example, the H and V (horizontal and vertical) parts of an antenna can receive the two orthogonal components of the reflected wave.

A radar system using H and V linear polarizations can thus have the following signals (or channels): HH—for signals that are horizontal transmit and horizontal receive, VV—for signals that are vertical transmit and vertical receive, HV—for signals that are horizontal transmit and vertical receive, and VH—for signals that are vertical transmit and horizontal receive. The HH and VV combinations are referred to as like-polarized, because the transmit and receive polarizations are the same. The HV and VH channels are cross-polarized because the transmit and receive polarizations are orthogonal to one another. The cross-polarized signals are created from a reflection that is not aligned perpendicularly with the direction of the propagation. As the reflection returns to the antenna at an angle other than parallel to the propagated angle, a portion of the horizontal signal results in a vertical component, and vice versa.

By examining the four signals, HH, VV, HV, and VH, all of the information necessary to describe the reflective source is captured. By examining the relative angle between the different signals and the power of the signals, the reflective source may be identified. The dual polarized radars of today, however, are unable to isolate and capture the different signals if the horizontal and vertical propagating signals are sent simultaneously.

SUMMARY OF THE INVENTION

An object of the invention includes a radar system includes a waveform generator, amplifiers, an antenna and a receiver. The waveform generator is configured to generate a first signal and a second signal. The first signal having a different shape from the second signal. The amplifiers are configured to amplify the first and second signals. The antenna is configured to simultaneously propagate the amplified first signal in a first plane and the amplified second signal in a second plane angularly rotated from the first plane. The receiver is configured to receive a first reflected signal having the shape of the first signal and a second reflected signal having a shape of the second amplified signal.

DETAILED DESCRIPTION OF THE DRAWINGS

Figure 2:
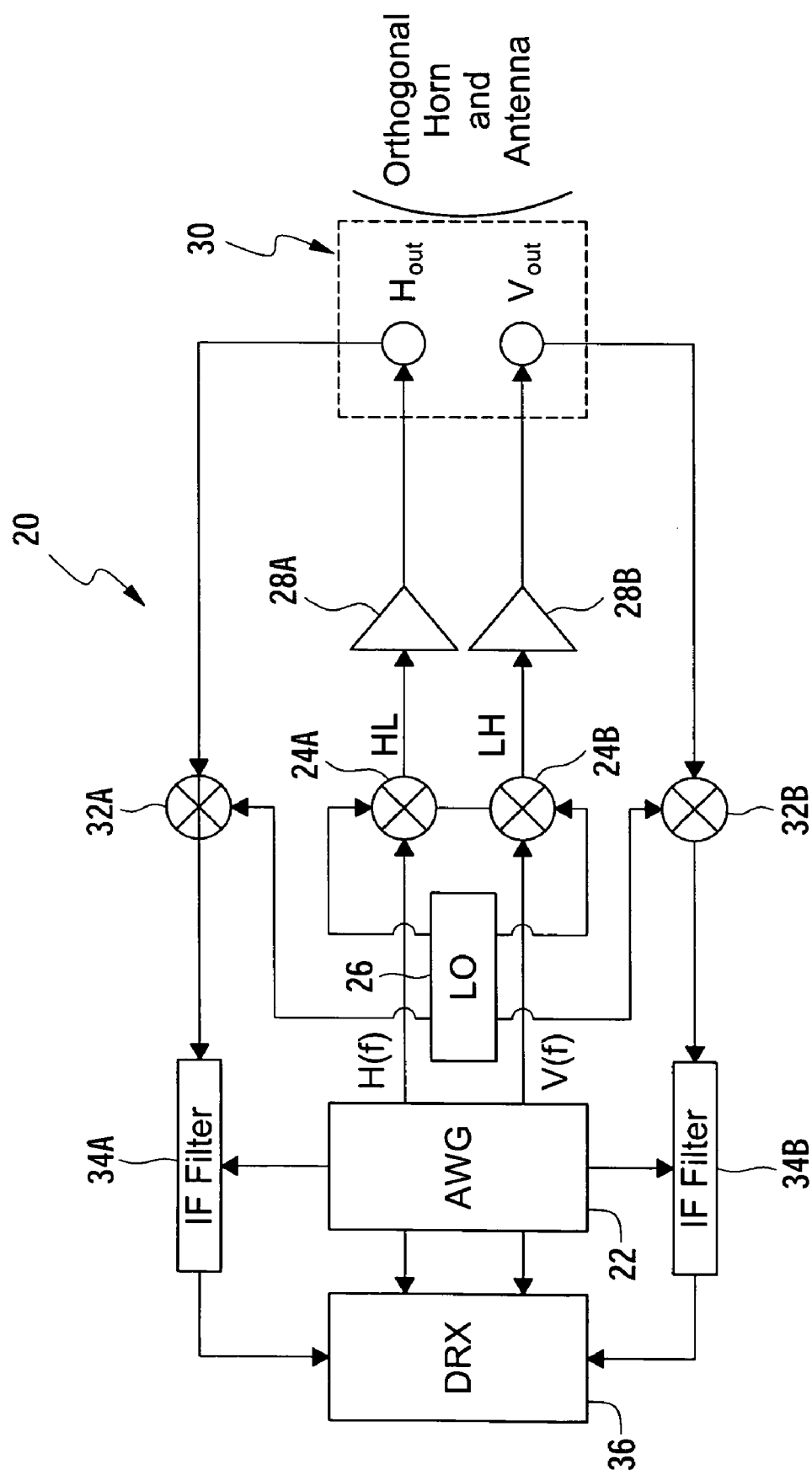
FIG. 2 is a diagram of one embodiment of a simultaneous dual polarization radar system.

Referring to the drawings, FIG. 2 shows a diagram of an embodiment of a simultaneous dual polarization radar system 20. An arbitrary waveform generator 22 generates an arbitrary waveform for the vertical and horizontal components at an intermediate frequency (IF) less than the transmitting frequency. The waveform in the arbitrary waveform generator 22 is passed to mixers 24A and 24B which combine the arbitrary waveforms with a stable local oscillator signal generated in a stable local oscillator 26. Amplifiers 28A and 28B amplify the signal from the mixers 24A and 24B and send the signals to an orthogonal feedhorn and antenna 30 for transmission.

The antenna and feedhorn 30 receive a scattered signal and transmit a horizontal and vertical scatter signal for processing in the radar system 20. Mixers 32A and 32B mix the vertical and horizontal components with the local stable oscillator signal from the local stable oscillator 26 to remove the local stable oscillator signal from the scatter signal. IF filters and 34B filter the scattered IF signals based on the arbitrary waveform from the arbitrary waveform generator 22 and filter the signal to remove all signal contributions outside a tight range of frequencies centered around the intermediate frequency. The digital receiver board 36 receives the filtered scattered signal and the arbitrary waveform and transforms the filtered scattered signal into the baseband in-phase and quadrature signals for data processing.

The arbitrary waveform generator 22 may create an arbitrary waveform for each of the horizontal and vertical signals at an intermediate frequency less than the transmitting frequency. While the arbitrary waveform generator 22 may create an arbitrary signal for both the horizontal and vertical signals, the arbitrary waveform generator 22 may also create only one arbitrary waveform for only one of the horizontal and vertical signals. Whether one or two arbitrary waveforms is generated may be determined by a user who may access the arbitrary waveform generator 22. When the horizontal and vertical signals are propagated, both signals do not need to be modulated.

The arbitrary waveform generator 22 may capture a 'real world' signal using a DSO or digitiser, may create the waveform from a mathematical formula, may create the waveform graphically using drawing tools, or may construct the waveform from a library of waveform shapes. The arbitrary generator may use any of these methods, or a combination of these methods to create a waveform. As will be described later, it is preferred that the waveform generator create a pair of signals that are orthogonal to each other to maximize the cross polar independence of the horizontal and vertical signals.

The arbitrary waveform generator 22 may include some level of built-in waveform editing such as point-by-point value insertion, straight line interpolation between points or standard waveform insertion between points. However, complex arbitrary waveforms are more likely created outside of the generator and downloaded via the digital interfaces in the arbitrary waveform generator 22. The arbitrary waveform generator 22 creates the horizontal and vertical signals and sends these signals to the mixers 24A and 24B to combine the arbitrary waveform with a stable signal that when combined with the arbitrary waveform creates a signal having a frequency desired for transmission.

In one embodiment, the arbitrary waveform generator 22 also sends the arbitrary waveform to the IF Filters 34A and 34B. The arbitrary waveform generator 22 provides the arbitrary signal so that the IF filters 34A and 34B may filter higher frequency components from the received signal to a narrow frequency band centered at the IF frequency. In another embodiment, the IF filters 34A and 34B may filter the higher frequency components from the received signal to a narrow frequency band centered at the IF frequency without first receiving the arbitrary waveform from the IF filters 34A and 34B. Once the IF filters 34A and 34B have filtered the higher frequency components from the received signal, the filtered signal components are passed to the digital receiver board 36.

The arbitrary waveform generator 22 also passes the arbitrary waveform to the digital receiver board 36 so that the digital receiver board 36 may digitize the received IF signal and transform it into the baseband in phase and quadrature signals. The received, baseband filtered signal contains the characteristics of the hydrometeors that reflected the transmitted signal. As will be described below, the characteristics of the arbitrary waveform allow all of the polarimetric data to be retrieved in a simultaneous dual polarization weather radar system.

The stable local oscillator 26 generates a stable, low noise reference source at a frequency equal to the transmitted frequency minus the intermediate frequency of the arbitrary waveform. The signals are mixed to produce a signal at the transmitted frequency. Generally, the signal from the local oscillator 26 is a carrier signal that is combined with the arbitrary waveform to form a horizontal signal unique to the vertical signal, but both signals having a transmitting frequency desirable for weather identification.

The signal from the oscillator 26 is also injected into the mixers 32A and 32B with the received signal from the antenna 30 in order to effectively change the received signal by heterodyning it to produce the sum and difference of that received signal. The difference signal will be at the intermediate frequency of the arbitrary waveform, plus or minus any doppler shift in the received signal. Thus removing the stable, oscillating signal from the received signal. The received signal is then passed at a frequency close to the intermediate frequency to the IF filters 34A and 34B.

The amplifiers 28A and 28B receive the signal from the mixers 24A and 24B and amplify the signals to the power level desired for transmission. In this power amplifier embodiment, the amplifiers may be klystrons, TWTs, or other MOPA systems. The size of the amplifiers 28A and 28B determines the maximum distance the transmitted signal can detect a reflector. The greater the amplification, the greater the distance a reflector may be detected. The amplifiers 28A and 28B feed the amplified signal to the orthogonal horn and antenna 30 for transmission.

Figure 1A:
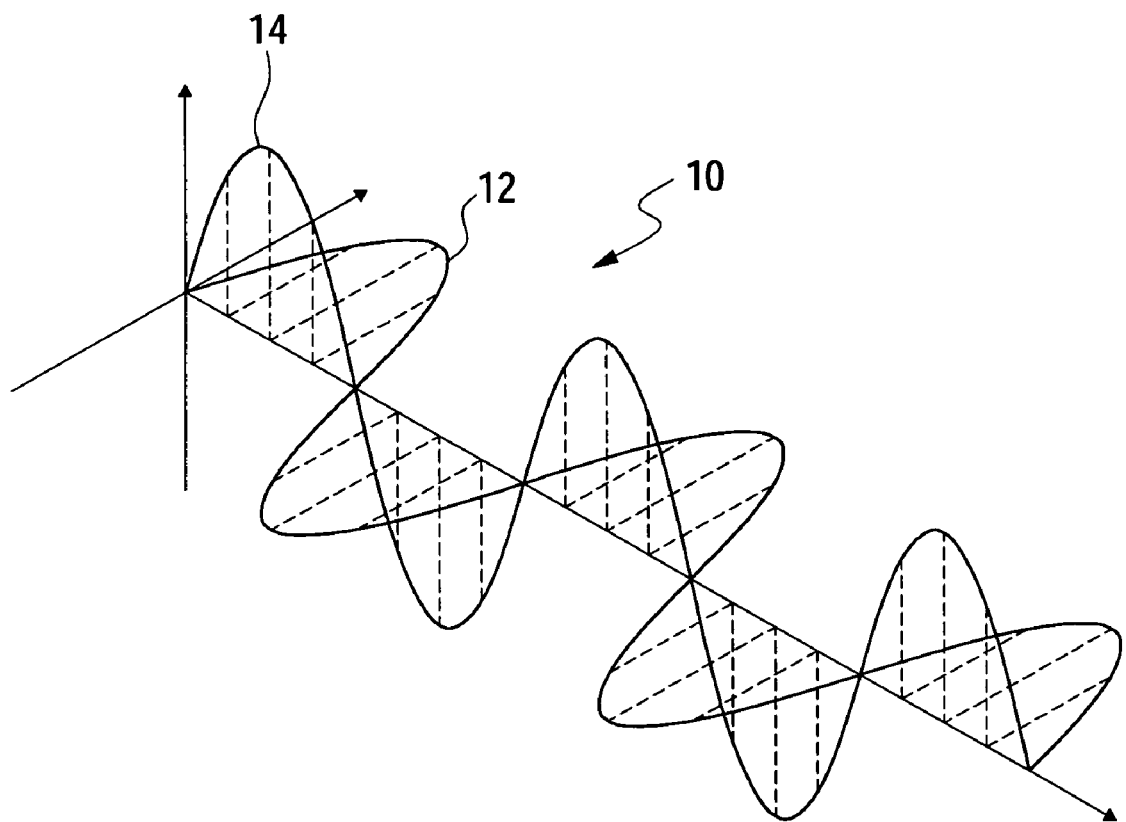
FIGS. 1A and 1B are diagrams of a prior art propagation signal for a simultaneous dual polarization radar system having a horizontal and vertical signal.
Figure 1B:
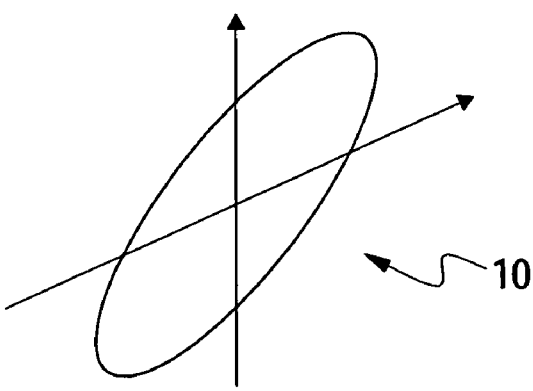

The horn 30 transmits the signal out as a pair of orthogonal signals (the horizontal signal and the vertical signal) in the elliptical shape described in FIG. 1. When the horn 30 receives a reflected signal, it passes the horizontal received signal to mixer 32A and the vertical received signal to mixer 32B. As previously discussed, these mixers 32A and 32B downconvert the received signals with the local oscillator signal to beat a signal at the intermediate frequency for processing by the IF filters 34A and 34B.

The IF filters 34A and 34B are tuned by the arbitrary waveform to remove all frequencies outside of a tight range of frequencies centered around the intermediate frequency. Thus, the IF filters 34A and 34B are passed the arbitrary waveform so that the IF filters 34A and 34B may set the intermediate frequency which creates the bandpass IF filter. Once the signal is filtered, and the signal left consists of the received horizontal and vertical arbitrary waveforms, then the signals are passed to the digital receiving board 36 for processing.

The digital receiving board 36 takes the horizontal and vertical received signals and generates the baseband in-phase and quadrature signals (I and Q signals.) These signals are the signals that determine the size, type, and direction of hydrometeors by giving the phase, frequency and amplitude of the received signals. The digital receiver board 36 takes the signals from the IF filters 34A and 34B and compares the information in those signals with the information in the arbitrary waveforms to calculate the I and Q signals of the received signals. As discussed below, the type of arbitrary waveforms generated in the arbitrary waveform generator 22 are chosen so that when the digital receiving board 36 captures the received signal, the board 36 can isolate the horizontal and vertical components (HH and VV) from the cross components (HV and VH).

The arbitrary waveforms are made up of a set of data values against time. A waveform could be captured from a 'real world' signal using a DSO or Digitiser. Alternatively, a waveform could be created from a mathematical formula, created graphically using drawing tools, or could be constructed from a library of waveform shapes. The arbitrary waveform generator 22 may use any of these of these methods. The arbitrary waveform generator 22 generates a pair of signals, a horizontal signal and a vertical signal, to send to the mixers 24A and 24B. The transmitted signal, then, may be characterized as a combination of these vertical and horizontal signals, or mathematically:

$$S_T = H_T \hat{H} + V_T \hat{V}$$

where $S_T$ is the transmitted signal;
$H_T$ is the amplitude of the horizontally transmitted signal, as amplified in amplifier 28A;
H is the horizontal vector;
$V_T$ is the amplitude of the vertically transmitted signal, as amplified in amplifier 28B; and
V is the vertical vector.

The received signal will have a similar form, having a vertical and horizontal component, or mathematically:

$$S_R = H_R \hat{H} + V_R \hat{V}$$

where $S_R$ is the received signal;
$H_R$ is the amplitude of the reflected horizontal signal;
H is the horizontal vector;
$V_R$ is the amplitude of the reflected vertical signal; and
V is the vertical vector.

The received signal, however, in each polarization, is a combination of the horizontal and vertical transmitted signals. As previously discussed, this is because when the transmitted signal is reflected, the signal rotates. When this occurs, the orthogonal projections of the signal to the H and V vectors include components from both the horizontally transmitted and vertically transmitted signals. Mathematically, the two received signals can be described as:

$$H_R = \alpha H_T + \beta V_T \text{ and } V_R = \delta H_T + \gamma V_T$$

Where $\alpha$, $\beta$, $\delta$, $\gamma$ are scalars related to the angular rotation of the horizontal and vertical signals and the proportion of the signal that is reflected back to the antenna 30. Thus, the scattering matrix of the received signal may be expressed as:

$$\begin{bmatrix} \alpha & \beta \\ \delta & \gamma \end{bmatrix}$$

and the matrix equation describing the received signal as a function of the transmitted signal may be expressed as:

$$\begin{bmatrix} H_R \\ V_R \end{bmatrix} = \begin{bmatrix} \alpha & \beta \\ \delta & \gamma \end{bmatrix} \begin{bmatrix} H_T \\ V_T \end{bmatrix}$$

The elements in the scattering matrix determine the cross polar received signal from the reflector. The diagonal terms are the amplitudes of the copolarized signals corresponding to the two transmitted polarizations, and the off-diagonal terms are the amplitudes of the cross-polarized signals. As can be seen in the equations, the ability to calculate the scalars determines whether good estimates for the horizontal and vertical components can be determined, which are the quantities desired for extrapolation of the base moment estimates.

Generally, either the horizontal, vertical or both signals may be coded. The horizontal and vertical signals may not be coded with the same signal, because then the horizontal and vertical signals would again be identical. As long as four samples are taken from the received signal, a definite solution for the scattering matrix may be found. It may be possible to solve the scattering matrix using less sample points given the constraints of the system. Thus, because the scalars cannot exceed a value of 1, and the scalars for the horizontal signal, $\alpha$ and $\delta$, are related through the rotation angle of the horizontal signal and the scalars for the vertical signal, $\beta$ and $\gamma$, are related through the rotation angle of the vertical signal. Such that, $$\alpha = H_{Rot} \cos \theta \text{ and } \delta = H_{Rot} \sin \theta$$

where $H_{Rot}$ is the rotated, received horizontal signal; and
$\theta$ is the angle of rotation of the horizontal signal.

Similarly, the scalars for the vertical signal may be expressed as, $$\beta = V_{Rot} \cos \phi \text{ and } \gamma = V_{Rot} \sin \phi$$

where $V_{Rot}$ is the rotated, received vertical signal; and
$\phi$ is the angle of rotation of the vertical signal.

The rotated signals $H_{Rot}$ and $V_{Rot}$ are attenuated transmitted signals. The amplitude of $H_{Rot}$ and $V_{Rot}$ is less than the amplitude of the transmitted signals. Thus, $H_{Rot}$ and $V_{Rot}$ are constrained to be less than the amplitude of the original signal. Using this constraint, as well as the angular relationships between α and δ and the angular relationship between β and γ, it may be possible to solve the scattering matrix using less than four samples from the received signal.

In a preferred embodiment, the arbitrary waveform generator 22 generates a pair of orthogonal signals and sends one of the orthogonal signals on the horizontal transmission path and the other signal on the vertical transmission path. By defining two functions that are orthogonal, the components of the horizontal signal contributed through the vertically transmitted signal and the components of the vertical signal contributed through the horizontally transmitted signal may be isolated in the received signals so that the horizontal and vertical components are completely recovered.

Mathematically, $$H_R = \Psi_H \alpha H_T + \Psi_V \beta V_T$$

and $$V_R = \Psi_H \delta H_T + \Psi_V \gamma_R V_T$$

Where $\Psi_V$ and $\Psi_H$ are the coding for the horizontal and vertical signals. Because these signals are orthogonal, and satisfy the equations:

$$\int_a^b \Psi_V(t) \Psi_H(t) dt = 0$$

and $$\Psi_H^{-1} \Psi_V = \Psi_V^{-1} \Psi_H = 0$$

when the inverse signals coded into the horizontal and vertical signals ($\Psi_V^{-1}$ and $\Psi_H^{-1}$) are multiplied through the two equations for received horizontal and vertical signals, the equations simplify to:

$$\Psi_V^{-1} H_R = \beta V_T$$

and $$\Psi_H^{-1} H_R = \alpha H_T$$

and $$\Psi_V^{-1} V_R = \gamma V_T$$

and $$\Psi_H^{-1} V_R = \delta H_T$$

$V_T, H_T, V_R, H_R, \Psi_V^{-1}$ and $\Psi_H^{-1}$ are all known, thus the scalars in the scattering matrix may be determined from these four equations. In the case of orthogonally coded horizontal and vertical signals, the processing required to determine the scattering matrix is minimized.

Figure 3:
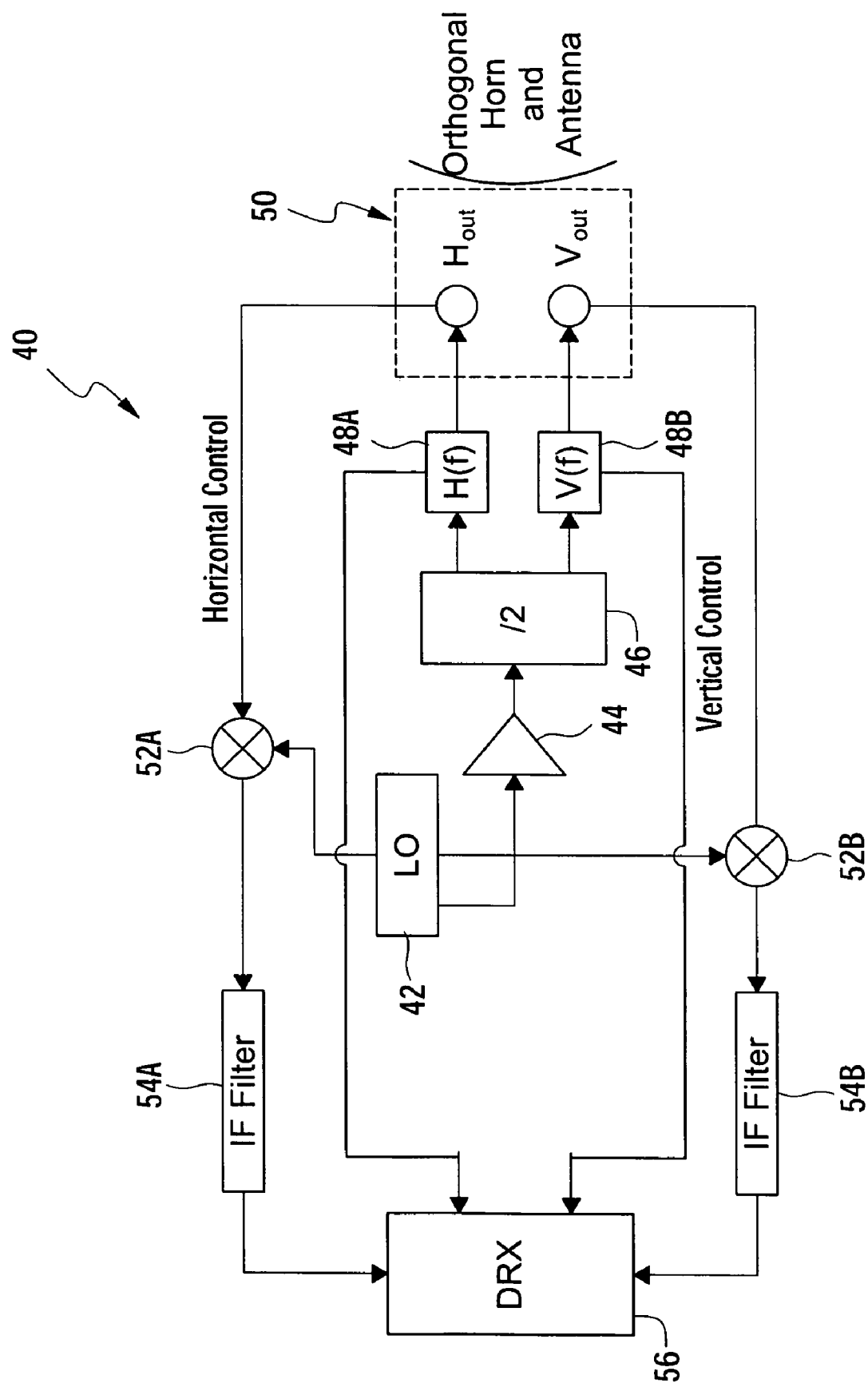
FIG. 3 is another diagram of one embodiment of a simultaneous dual polarization radar system.

Turning now to FIG. 3, FIG. 3 shows another diagram of a simultaneous dual polarization radar system 40 using a single transmitter configuration. A stable local oscillator 42 generates a stable local oscillator signal. An power component 44 amplifies the stable local oscillator signal. A power divider 46 splits the amplified signal into two identical signals. High powered waveguide components 48A and 48B modulate the amplified signal with one arbitrary waveform for the vertical and one arbitrary waveform for the horizontal component. An orthogonal feedhorn and antenna 50 transmit the modulated signal into air.

Similar to the system of FIG. 2, the antenna and feedhorn 50 receive the scattered signal and transmit a horizontal and vertical scatter signal for processing in the radar system 40.

Mixers 52A and 52B mix the vertical and horizontal components with the local stable oscillator signal from the local stable oscillator to remove the local stable oscillator signal from the scatter signal. IF filters 54A and 54B filter the scattered IF signals based on the arbitrary waveform from the arbitrary waveform generator and filter the signal to remove all signal contributions outside a tight range of frequencies centered around the intermediate frequency. A digital receiver board 56 receives the filtered scattered signal and the arbitrary waveform and processes the baseband in-phase and quadrature signals for data processing.

Many of the parts in the power single transmitter radar system 40 behave in the same manner as the similar components in FIG. 2. The processing of the scattered signal is the same, and includes all of the same components. The difference in the systems of FIG. 2 and FIG. 3 is the difference in the generation of the transmitted signal. Both systems use a stable oscillator to form a portion of the transmitted signal and an orthogonal feed horn and antenna to propagate orthogonal vertical and horizontal components. The power component 44 of FIG. 3 may be a power amplifier such as that of a MOPA system or, in a different embodiment, a power oscillator such as a magnetron. In a MOPA system, the stable local oscillator 42 passes the signal for amplification to a power amplifier. In a power oscillator system, the stable local oscillator 42 generates a signal at a frequency equal to the transmitted frequency minus the IF frequency. The signal from the stable local oscillator 42 is mixed with the received signal to produce the IF frequency signal.

Other components are generally similar but are used slightly differently. In the single transmitter simultaneous dual polarization radar system of FIG. 3, such as a magnetron based system, the coded signal is not introduced into the system until after the amplification. In the dual transmitter power amplifier system of FIG. 2, the reference signal is modulated prior to amplification. Where a pair of amplifiers are used in the power amplifier system, only one amplifier is used in the power amplifier system. Additionally, the single transmitter system 40 includes a power divider 46 and a pair of power waveguide components 48A and 48B.

The power divider 46 takes the single, amplified signal from the amplifier or power oscillator 44 and divides the signal into two identical signals. Because the power is halved for each signal, the high power component 44 outputs a signal that is larger than the amplifiers in FIG. 2 to meet the same power specifications for the antenna. The two identical wave signals leave the power divider 46 and enter the high power coding devices 48A and 48B.

The high power waveguide components 48A and 48B code the identical signals similar to the function of the waveguide in FIG. 2. The high power coding device may be a resonant cavity that shapes the wave according to the desired coding. In one embodiment, the code may be generated within the receiver 56 or a signal processor. The code may also be preprogrammed into high power waveguide components 48A and 48B or mechanically based on the structure of the preprogrammed devices.

While the embodiment of FIG. 3 uses a pair of high power coding devices (the high power waveguide components 48A and 48B), another embodiment may only have a single high power coding device. With a single high power coding device, one of the signals would be coded and the other signal would be left alone. The signal modulated may be either the vertical or horizontal signal. Regardless whether one or two high power coding devices 48A and 48B are used, the coded signal from the high power devices 48A and 48B are also sent to the receiving elements which process the received signal.

The coded signal is sent to the IF filters 54A and 54B as well as the digital receiving board 56. Similar to the configuration of FIG. 2, the IF filters 54A and 54B filter the received signal to a narrow frequency band around the IF frequency for processing in the digital receiving board 56. The digital receiving board 56, as discussed above, uses the coded signal from the high power devices 48A and 48B to process the filtered IF signal from the IF filters 54A and 54B. In this manner, the coded signal from the high power devices 48A and 48B serve as the transmitted horizontal and vertical signals for processing.

Figure 4:
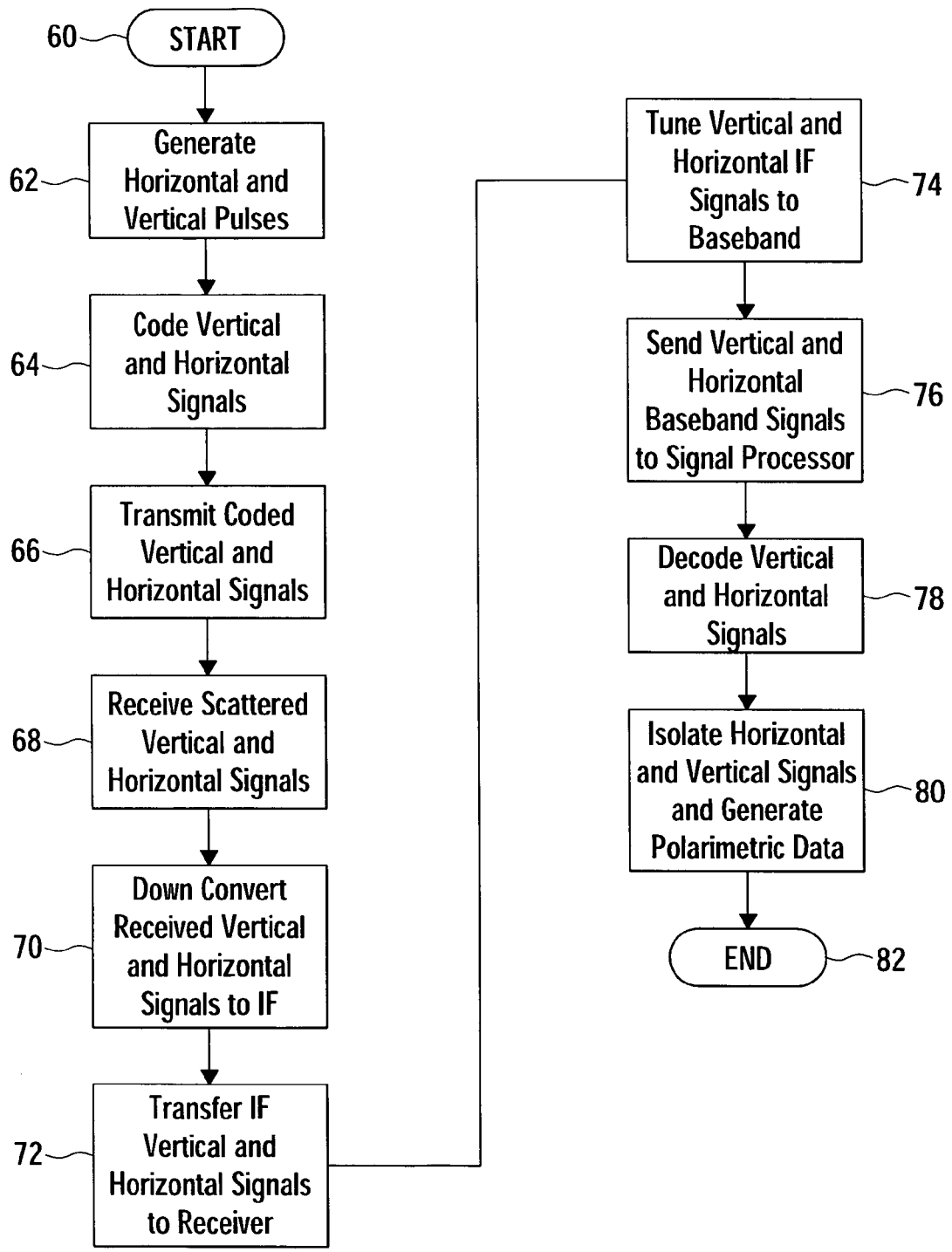
FIG. 4 is a block diagram of the steps performed in one embodiment of the simultaneous dual polarization radar system.

Turning now to FIG. 4, FIG. 4 is a block diagram of the steps performed in one embodiment of the simultaneous dual polarization radar system. The method starts in Step 60. Horizontal and vertical pulses are generated in step 62. The horizontal and vertical signals are coded in step 64. In step 66, the coded signals are transmitted. The vertical and horizontal scattered signals are received by the radar system in step 68. The vertical and horizontal signals are downconverted in step 70 to remove a stable oscillating signal from the received signal so that the intermediate frequency signal is left. The IF signal is transferred in step 72 and processed to the baseband signals in step 74. The baseband signals are sent to a signal processor in step 76 and decoded in step 78 using the coding from the transmitted signal to determine the values within the scattering matrix. The vertical and horizontal received signals are isolated and the polarimetric data is calculated in step 80. The method ends in step 82.

By implementing the method of FIG. 4, a polarimetric radar system may simultaneously send vertical and horizontal components in a transmitted signal and isolate the vertical and horizontal components to process the data received in both the horizontal and vertical components resolved using signals in both the horizontal and vertical planes. The method also decreases the long dwell times of polarimetric radar systems which switches between sending a single horizontal or vertical signal. By using a simultaneous dual system, the velocity characteristics of the reflectors may also be resolved with higher specificity because the delay between receiving like signals is halved.

While the invention has been shown in embodiments described herein, it will be obvious to those skilled in the art that the invention is not so limited but may be modified with various changes that are still within the spirit of the invention.

Having set forth the nature of the invention, what is claimed is:

1. A radar system, comprising:
   a. a waveform generator configured to generate a first signal and a second signal, said first signal having a different shape from said second signal;
   b. amplifiers configured to amplify said first and second signals;
   c. an antenna configured to simultaneously propagate said amplified first signal in a first plane and said amplified second signal in a second plane angularly rotated from said first plane;
   d. a receiver configured to receive a first reflected signal having the shape of said first signal and a second reflected signal having a shape of said second amplified signal;
   e. a stable local oscillator configured to generate a stable oscillating signal at a frequency equal to the difference between said propagated frequency and said intermediate frequency; and
   f. wherein said waveform generator generates said first and second signals at an intermediate frequency less than the frequency of said propagated first and second signals.

2. The radar system of claim 1, further comprising a mixer configured to mix said first and second signals with said stable oscillating signal.

3. The radar system of claim 2, wherein said first and second signals are mixed with said stable oscillating signal prior to the amplification of said first and second signals.

4. The radar system of claim 3, further comprising a pair of mixers configured to mix said stable oscillating signal with said first and second reflected signals.

5. A radar system comprising:
   a. an oscillator configured to generate a low power signal;
   b. an amplifier configured to amplify said low power signal to a high power signal;
   c. a power divider configured to split said high power signal into a first amplified signal and a second amplified signal;
   d. a high powered coding device configured to inject a code into said first signal;
   e. an antenna configured to simultaneously propagate said amplified first signal in a first plane and said amplified second signal in a second plane angularly rotated from said first plane; and,
   f. a receiver configured to receive a first reflected signal having the shape of said first signal and a second reflected signal having a shape of said second amplified signal.

6. The radar system of claim 5, wherein said first plane is orthogonal to said second plane.

7. The radar system of claim 5, wherein said first amplified signal is identical to said second amplified signal.

8. The radar system of claim 5, further comprising a second high powered coding device configured to code said second amplified signal wherein said oscillator generates said first and second signals at an intermediate frequency less than the frequency of said propagated first and second signals.

9. The radar system of claim 8, wherein said high power devices are configured to generate a first and second code at a frequency equal to the difference between said propagated frequency and said intermediate frequency.

10. The radar system of claim 9, wherein said first code is orthogonal to said second code.

11. The radar system of claim 10, further comprising a pair of mixers configured to mix said low power signal with said first and second reflected signals.

12. The radar system of claim 11, wherein said first and second codes are sent to said receiver.

13. The radar system of claim 5, wherein said receiver is further configured to receive said code from said high powered coding device.

14. The radar system of claim 13, wherein said receiver isolates said first and second reflected signals by comparing said first and second received signals to said code.

15. The radar system of claim 5, wherein said antenna is further configured to receive said first and second reflected signals.

16. The radar system of claim 5 wherein said antenna receives said first and second reflected signals received in said first and second plane.

17. The radar system of claim 16 wherein said first plane is orthogonal to said second plane.

18. The radar system of claim 16 wherein:
   a. said antenna is further configured to receive a first planar signal including a portion of said first reflected signal and a portion of said second reflected signal;
   b. said antenna is further configured to receive a second planar signal including a portion of said first reflected signal and a portion of said second reflected signal; and
   c. said receiver is further configured to calculate an angular rotation of said first and second reflected signal from said first and second plane.

* * * * *